Nov. 20, 1962  R. PICKARD  3,064,385
INCLOSED POWERED FISHING REEL AND ROD
Filed Oct. 9, 1961  2 Sheets-Sheet 2
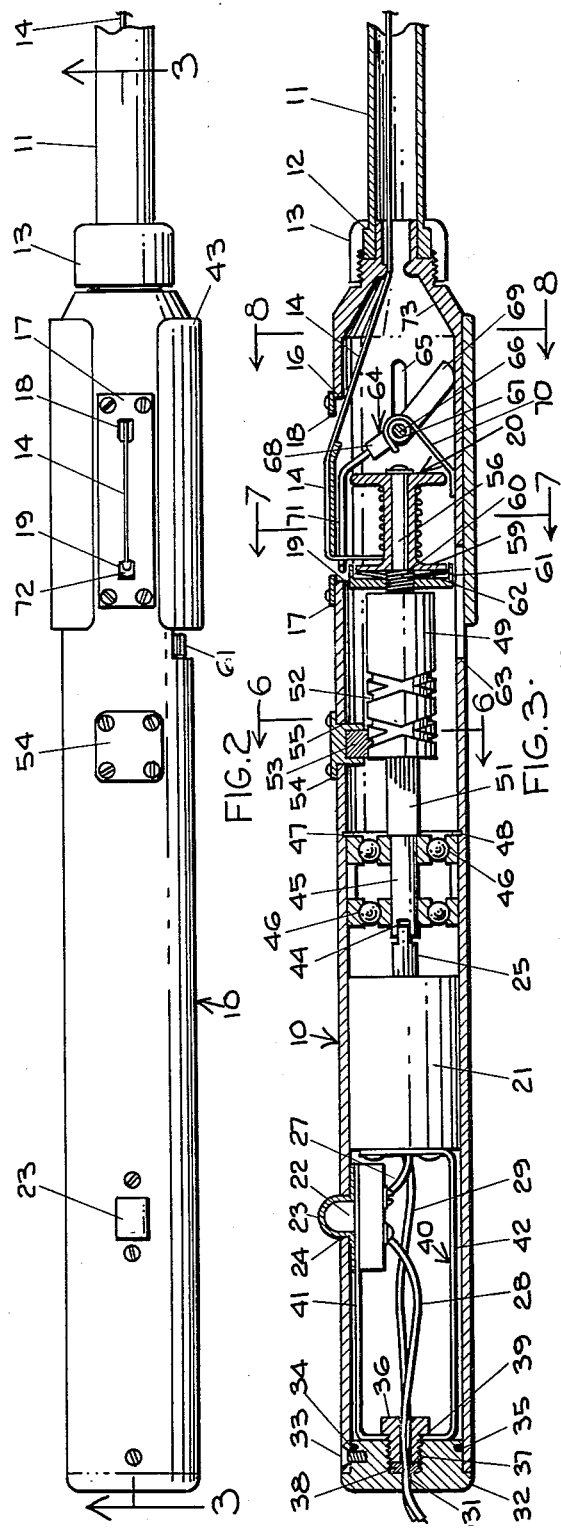
INVENTOR.
ROD PICKARD
BY Salvatore G. Militana
attorney

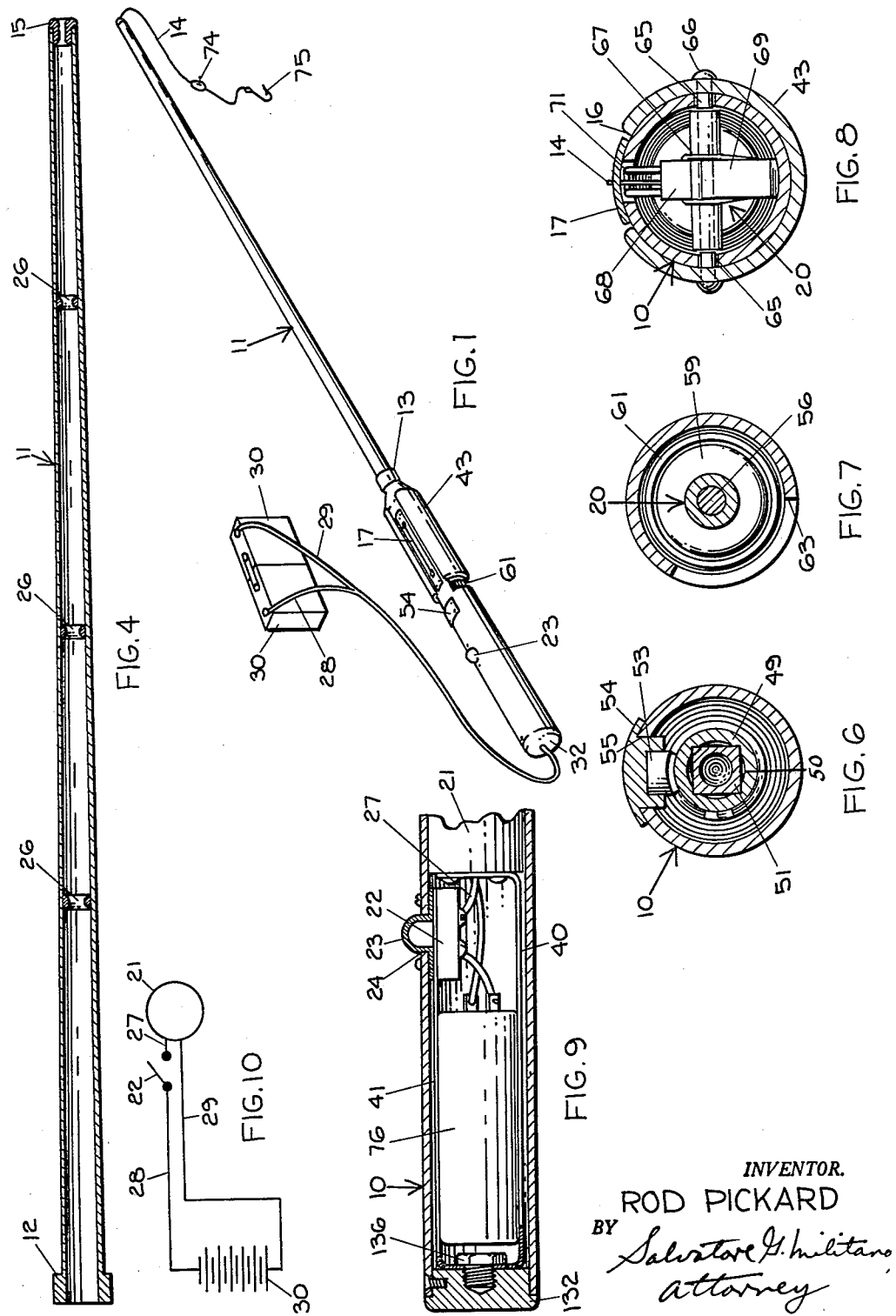

United States Patent Office 3,064,385
Patented Nov. 20, 1962

3,064,385
INCLOSED POWERED FISHING REEL AND ROD
Rod Pickard, 615 SW. 2nd Ave., Miami, Fla.
Filed Oct. 9, 1961, Ser. No. 143,703
6 Claims. (Cl. 43—21)

This invention relates to a fishing reel and rod and is more particularly directed to an inclosed powered fishing reel and rod.

A principal object of the present invention is to provide a fishing reel and rod which is powered by a motor which is completely inclosed in the rod with wires extending through the end of the rod to a source of electricity.

Another object of the present invention is to provide an inclosed powered fishing reel and rod which is simple in construction and operation and most effective for use when casting or when bringing in a big fish with the powered reel.

Another object of the present invention is to provide an inclosed powered fishing reel and rod with a powered level winder mechanism for winding the fishing line properly on a reel and a bale mechanism for placing the fishing line in position for unreeling from the reel for casting purposes.

A still further object of the present invention is to provide an inclosed powered fishing reel and rod with mechanism hermetically sealed within the rod to prevent the infiltration of moisture, dust and the like therein.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

FIGURE 1 is a perspective view of a powered fishing rod and reel constructed in accordance with my invention.

FIGURE 2 is a top plan view of my fishing rod.

FIGURE 3 is a cross sectional view taken along the line 3—3 of FIGURE 2.

FIGURE 4 is a similar view taken along the longitudinal axis of the hollow rod.

FIGURE 5 is a fragmentary cross sectional view similar to FIGURE 3 showing the position of the various parts for casting.

FIGURES 6, 7 and 8 are transverse cross sectional views taken along the lines 6—6, 7—7 and 8—8 respectively of FIGURE 3.

FIGURE 9 is a fragmentary cross sectional view of a modified construction showing the use of an inclosed miniature battery.

FIGURE 10 is a schematic wiring diagram.

Referring to the drawings wherein like numerals are used to designate similar parts throughout the several views, there is shown my powered fishing rod consisting of a hollow cylindrical housing 10 and a hollow rod 11 preferably constructed of fiberglass removably attached thereto. The hollow rod 11 is provided at one end with a retaining shoulder 12 which is engaged by a coupling type knurled nut 13 threaded on the end of the housing 10 for releasably securing the housing 10 and rod 11 together. Since the rod 11 guides a fishing line 14 through its hollow interior, a plurality of ring guides 26 are pressed into position within the rod 11 and an end guide 15 mounted at the outermost end of the rod 11.

The fishing line 14 extends rearwardly through the forward end of the housing 10 and emerges from the housing 10 through a slot 16 formed on the upper side of the housing 10. Mounted over the slot 16 is a line guide plate 17 having openings 18 and 19 for the line 14 to extend therethrough. The fishing line 14 emerges from the housing 10 through the opening 18 and reenters the housing 10 at the opening 19 where the line 14 is received on a spool or reel 20. Means are provided to operate the spool 20 by electric power comprising a motor 21 mounted in the housing 10 and connected by a conductor 27 to a pushbutton switch 22 mounted in an opening 24 at the lower end portion of the housing 10. In order to prevent moisture, salt water and the like from entering the housing 10, the switch 22 is sealed against infiltration of moisture through the opening 24 by a rubber or otherwise resilient and waterproof cover 23 extending over the switch 22. The switch 22 is connected by a conductor 28 to one side of a source of electrical energy, namely a battery 30 having the proper voltage for operating the motor 21. A conductor 29 connects the other side of the battery 30 and the motor, the insulated conductors 28 and 29 entering the housing 10 through a centrally disposed bore 31 in a plug 32 secured by set screw 33 in the end of the cylindrical housing 10. An O-ring 34 positioned in a peripheral groove 35 formed on the inner end of the plug 32 seals the end of the housing 10. A second plug 36 threaded in to an enlarged bore 37 against a rubber disk or seal 38 seals the bore 31 through which the insulated conductors 28, 29 extend. The motor 21 and the switch 22 are mounted on a bracket 40 having arms 41 and 42 secured to the switch 22 and the motor 21 respectively and having at its mid-portion a bore 39 which receives the plug 36 and is secured thereto by a cap portion of the plug 36. This construction permits the assembly of the motor 21 and switch 22 on the bracket 40 which is then affixed to the plugs 32, 36 as shown by FIGURE 3 with the wires 27, 28 and 29 connected as shown and extending through the bore 31. The motor 21 and switch 22 along with the bracket 40 are inserted through the open end of the housing 10 and the plug 32 fitted into the end of the housing 10 and secured by the set screw 33. The arm 41 of the bracket 40 will flex inwardly until the switch 22 arrives at the opening 24 where the switch 22 is then secured in position. The motor shaft 25 which is non-circular in cross section is simultaneously received by a bore 44 in a drive shaft 45 journalled in the housing 10 by the ball bearing assembly 46. The latter is fitted tightly in position within the housing 10 and prevented from moving laterally by a split ring 47 positioned in a peripheral slot 48 and bearing against the forward edge of the ball bearing assembly 46. Rotation of the motor shaft 25 will cause the drive shaft 45 to rotate in unison with a level winder cylinder 49 and the reel 20. The level winder cylinder 49 is provided with a bore 50 which receives a shaft 51 extending forwardly of the drive shaft 45. The shaft 51 is non-circular and of slightly smaller dimension than that of the bore 50 to permit the level winder 49 to slide laterally with relation to the shaft 51 as both rotate together.

The level winder cylinder 49 is provided with the conventional continuous reversing thread or groove 52 found on the conventional fishing reels, with a dog 53 extending into the thread 52. The dog 53 is supported on a retainer member 54 mounted in an opening 55 in the housing 10 and secured thereon.

The reel 20 is secured for rotational movement on a reel shaft 56 with a nut 57 tightened against the outer flange 58 of the reel 20. The reel shaft 56 extends forwardly of a threaded shaft 60 secured to the forward portion of the level winder cylinder 49. Threadedly mounted on the shaft 60 is a drag adjusting member 61 which applies a selective drag or resistance to rotational movement to the reel 20 by means of a leaf spring 62 interposed between the member 61 and an inner flange 59 of the reel 20. As the drag adjusting member 61 is threaded on the shaft 60 in the direction of the inner flange 61, the leaf spring exerts an increased force on the reel 20 and tightens it against the nut 57. This increases the amount of force necessary to be applied by a pull on the line 14 as by a fish to prevent the reel 20 from rotating and reeling in the line 14 as the motor 21 continues to rotate. The drag adjusting member 61 may be adjusted by inserting one's thumb or fingers through an opening 63, engaging the knurled surfaces of the drag adjusting member 61 and rotating same to increase or lessen the force being exerted by the leaf spring 62 on the reel 20 to accordingly increase or decrease the drag thereon.

From the above description, it can be readily ascertained that when the switch 22 is actuated, the motor 21 will be energized and the motor shaft 25 will commence to rotate causing the drive shaft 45 and the level winder cylinder 49 to rotate simultaneously therewith. Since the dog 53 is positioned in the continuous reversing thread 52, the cylinder 49 will slide laterally back and forth as it rotates. At the same time, the spool or reel 20 will slide laterally back and forth as it rotates and winds the fishing line 14 or the reel 20 in a level manner as best shown by FIGURE 3. If there is a greater pulling force on the line as by a fish than the drag resistance effected by the force of the leaf spring 62 against the flange 59 of the reel 20, the motor 21 will continue to rotate, but the reel 20 will not rotate therewith until the force being exerted on the fishing line 14 is reduced to below that of the drag at which time the reel 20 will rotate with the motor 21.

Means are provided for casting or the unwinding of the fishing line 14 from the reel 20 comprising a bale 64 mounted for lateral sliding movement in the housing 10 along a pair of oppositely positioned slots 65. Slidably mounted in the slots 65 is a shaft 66 on which a sleeve 67 is rotatably mounted. To the sleeve 67 there are secured a bale support 68, a bale positioning finger 69 and a bale spring 70. The finger 69 and the bale spring 70 engage the inner side wall of the housing 10 while the bale support 68 receives the ends of a bale 71. The bale 71 is constructed of a length of rod-like material bent on itself to form a loop 72 which engages the fishing line 14 when a casting sleeve 43 which is secured to the ends of the shaft is slid forwardly on the housing 10. As the bale 64 slides forwardly the bale loop 72 engages the fishing line 14 and pulls it to a position forwardly of the outer flange 58 of the reel 20. As the casting sleeve 43 is continued to be pushed forwardly on the housing 10, the bale positioning finger 69 will engage an inclined surface 73 of the housing 10 and slide upwardly thereon to cause the bale wire 71 to tilt downwardly and the bale loop to be positioned at approximately the axis of the fishing reel 20 as best shown by FIGURE 5. With the bale 64 in this position, when the fishing rod 11 is swung to cast the sinker 74 and hook 75 attached to the fishing line 14, the line 14 will wind off the fishing reel 20 over the edge of the outer flange 58 of the reel 20 in the same manner as occurs when casting with a conventional spinning reel.

If it is desired to completely inclose my device as shown by FIGURE 9, a miniature battery 76 is mounted on the bracket 40 within the housing 10. In this alternate structure, the plug 132 and 136 will not be provided with any opening for wires as is required in the structure shown by FIGURE 3 and all of the structure will be contained within the housing 10.

What I claim as new and desire to secure by Letters Patent of the United States is:

1. An inclosed powered fishing reel and rod comprising a tubular housing, a motor mounted in said housing, drive shaft means connected to said motor, a stub shaft having a non-circular cross section operatively connected at one end to said drive shaft means, a level winder cylinder having a continuous reversing thread on its outer surface and an axially disposed non circular slot, the other end of said stub shaft being telescopically received by said non circular slot, a dog mounted on said housing and engaging said continuous reversing thread whereby upon rotation of said drive shaft said level winder cylinder will rotate and reciprocate on said stub shaft, a further shaft mounted on said level winder cylinder and extending axially therefrom, a reel mounted on said further shaft, adjustable means mounted on the said further shaft and engaging said reel for frictionally securing said reel to said further shaft, said tubular housing having an opening in proximity of said reel and a fishing line wound about said reel and extending through said opening.

2. An inclosed powered fishing reel and rod comprising a tubular housing, a motor mounted in said housing, drive shaft means connected to said motor, a stub shaft having a non-circular cross section operatively connected at one end to said drive shaft means, a level winder cylinder having a continuous reversing thread on its outer surface and an axially disposed non-circular slot, the other end of said stub shaft being telescopically received by said non circular slot, a dog mounted on said housing and engaging said continuous reversing thread whereby upon rotation of said drive shaft said level winder cylinder will rotate and reciprocate on said stub shaft, a further shaft mounted on said level winder cylinder and extending axially therefrom, a reel mounted on said further shaft, said reel having an outer flange and an inner flange adjustable means mounted on the said further shaft and engaging said inner flange for frictionally securing said reel to said further shaft, said tubular housing having an opening in proximity of said reel, a fishing line extending through said opening and wound on said reel and bale means mounted in spaced relation to said outer flange in said tubular housing and engaging said fishing line whereby said fishing line being unreeled from said reel extends over said outer flange of said reel.

3. An inclosed powered fishing reel and rod comprising a tubular housing, a motor mounted in said housing, drive shaft means connected to said motor, a stub shaft having a non-circular cross section operatively connected at one end to said drive shaft means, a level winder cylinder having a continuous reversing thread on its outer surface and an axially disposed non circular slot, the other end of said stub shaft being telescopically received by said non circular slot, a dog mounted on said housing and engaging said continuous reversing thread whereby upon rotation of said drive shaft said level winder cylinder will rotate and reciprocate along its axis, a further shaft mounted on said level winder cylinder and extending axially therefrom, a reel mounted on said further shaft, said reel having an outer flange and an inner flange, adjustable means mounted on the said further shaft and engaging said inner flange for frictionally securing said reel to said further shaft, said tubular housing having an opening in proximity of said reel, a fishing line wound about said reel and extending through said opening, bale support means rotatably mounted in spaced relation to said outer flange of said reel, a bale mounted on said bale support means extending over said outer flange of said reel and engaging said fishing line in proximity of said opening, means mounted on said housing for sliding said bale in a direction away from said reel, spring means yieldingly urging said bale in a position over said flange of said reel and further means operatively connected to said bale support means for rotating said bale support means upon sliding said bale support means to a position where said bale engages said fishing line in spaced relation to said outer flange of said reel whereby said fishing line may be removed from said reel without rotating said reel.

4. An inclosed powered fishing reel and rod comprising a tubular housing, a motor mounted in said housing, drive shaft means connected in axial alignment to a forward portion of said motor, a bracket secured to a rear portion of said motor and extending to adjacent the rear end of said housing, a plug having an opening secured to the rear end of said housing, means securing said bracket to said plug, said housing having an opening adjacent said motor, a switch secured to said bracket and mounted in said housing extending through said opening in said housing, electric wires connecting said switch and said motor and extending outwardly of said housing through said opening in said plug, a battery connecting said wires for energizing said motor, a stub shaft having a non-circular cross section operatively connected at one end to said drive shaft means, a level winder cylinder having a continuous reversing thread on its outer surface and an axially disposed non-circular slot, the other end of said stub shaft being received telescopically by said non circular slot, a dog mounted on said housing and engaging said continuous reversing thread whereby upon rotation of said drive shaft said level winder cylinder will rotate and reciprocate along said stub shaft, a further shaft mounted on said level winder cylinder and extending axially therefrom, a reel mounted on said further shaft, said reel having an inner and an outer flange, fastening means mounted on said further shaft for securing said reel, a leaf spring in contact relation with the outer surface of said inner flange, a drag adjustment member threadedly mounted on said further shaft and engaging said leaf spring for adjusting the drag on said reel, said tubular housing having an opening in proximity of said reel, a fishing line wound about said reel and extending through said last named opening, bale support means rotatably mounted forwardly of said outer flange, a bale mounted on said bale support means, extending over said outer flange and engaging said fishing line in proximity of said last named opening, sleeve means mounted on said housing for sliding said bale forwardly of said reel, spring means yieldingly urging said bale to a position over said outer flange of said reel, and further means operatively connected to said bale support means for rotating said bale support means upon sliding said bale support means in a forward direction to a position whereby said bale engages said fishing line and carries said line forwardly of said outer flange and in substantial axial alignment with said reel whereby said fishing line may be removed from said reel without rotating said reel.

5. An inclosed powered fishing reel and rod comprising a tubular housing, a motor mounted in said housing, drive shaft means connected in axial alignment to a forward portion of said motor, a bracket secured to a rear portion of said motor and extending to adjacent the rear end of said housing, a plug secured to the rear end of said housing, means securing said bracket to said plug, said housing having an opening adjacent said motor, a switch secured to said bracket and mounted in said housing extending through said opening, a battery mounted on said bracket in said housing, electric wires connecting said switch with said battery and said motor, drive shaft means connected to said motor and extending forwardly and in axial alignment with said motor, a stub shaft having a non-circular cross section operatively connected at one end to said drive shaft means, a level winder cylinder having a continuous reversing thread on its outer surface and an axially disposed non circular slot, the other end of said stub shaft being telescopically received by said non circular slot, a dog mounted on said housing and engaging said continuous reversing thread whereby upon rotation of said drive shaft said level winder cylinder will rotate and reciprocate along said stub shaft, a further shaft mounted on said level winder cylinder and extending axially therefrom, a reel mounted on said further shaft, said reel having an inner and an outer flange, fastening means mounted on said further shaft for securing said reel, a leaf spring in contact relation with the outer surface of said inner flange, a drag adjustment member threadedly mounted on said further shaft and engaging said leaf spring for adjusting the drag on said reel, said tubular housing having an opening in proximity of said reel, a fishing line wound about said reel and extending through said last named opening, bale support means rotatably mounted forwardly of said outer flange, a bale mounted on said bale support means, extending over said outer flange and engaging said fishing line in proximity of said last named opening, sleeve means mounted on said housing for sliding said bale forwardly of said reel, spring means yieldingly urging said bale to a position over said outer flange of said reel, and further means operatively conected to said bale support means for rotating said bale support means upon sliding said bale support means in a forward direction to a position whereby said bale engages said fishing line and carries said line forwardly of said outer flange and in substantial axial alignment with said reel whereby said fishing line may be removed from said reel without rotating said reel.

6. An inclosed powered fishing reel and rod comprising a tubular housing, a motor mounted in said housing, drive shaft means connected in axial alignment to a forward portion of said motor, a bracket secured to a rear portion of said motor and extending to adjacent the rear end of said housing, a plug having an opening secured to the rear end of said housing, means securing said bracket to said plug, said housing having an opening adjacent said motor, a switch secured to said bracket and mounted in said housing extending through said opening in said housing, electric wires connecting said switch and said motor and extending outwardly of said housing through said opening in said plug, a battery connecting said wires for energizing said motor, a stub shaft having a non-circular cross section operatively connected at one end to said drive shaft means, a level winder cylinder having a continuous reversing thread on its outer surface and an axially disposed non circular slot, the other end of said stub shaft being received telescopically by said non circular slot, a dog mounted on said housing and engaging said continuous reversing thread whereby upon rotation of said drive shaft said level winder cylinder will rotate and reciprocate along said stub shaft, a further shaft mounted on said level winder cylinder and extending axially therefrom, a reel mounted on said further shaft, said reel having an inner and an outer flange, fastening means mounted on said further shaft for securing said reel, a leaf spring in contact relation with the outer surface of said inner flange, a drag adjustment member threadedly mounted on said further shaft and engaging said leaf spring for adjusting the drag on said reel, said tubular housing having an opening in proximity of said reel, a fishing line wound about said reel and extending through said last named opening, bale support means rotatably mounted forwardly of said outer flange, a bale mounted on said bale support means, extending over said outer flange and engaging said fishing line in proximity of said last named opening, sleeve means mounted on said housing for sliding said bale forwardly of said reel, spring means yieldingly urging said bale to a position over said outer flange of said reel, and further means operatively connected to said bale support for rotating said bale support means upon sliding said bale support means in a forward direction to a position whereby said bale engages said fishing line and carries said line forwardly of said outer flange and in substantial axial alignment with said reel whereby said fishing line may be removed from said reel without rotating said reel, a hollow fishing rod removably secured to the forward end of said housing, a further opening in said housing forwardly of said last named opening, said fishing line extending through said further opening, into said housing and through said hollow fishing rod and line guide means mounted in said hollow fishing rod for guiding said fishing line.

References Cited in the file of this patent

UNITED STATES PATENTS

| | | |
|---|---|---|
| 1,955,973 | Norton | Apr. 24, 1934 |
| 2,262,671 | Fanshier | Nov. 11, 1941 |
| 2,711,046 | Duplantis | June 21, 1955 |
| 2,866,291 | Duell | Dec. 30, 1958 |

FOREIGN PATENTS

| | | |
|---|---|---|
| 1,208,375 | France | Sept. 14, 1959 |